United States Patent
Tamura et al.

(10) Patent No.: US 10,505,424 B2
(45) Date of Patent: Dec. 10, 2019

(54) STATOR OF ROTATING ELECTRIC MACHINE

(71) Applicant: DENSO CORPORATION, Kariya, Aichi-pref. (JP)

(72) Inventors: Akito Tamura, Kariya (JP); Akira Fukushima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/244,155

(22) Filed: Jan. 10, 2019

(65) Prior Publication Data

US 2019/0149004 A1 May 16, 2019

Related U.S. Application Data

(63) Continuation of application No. PCT/JP2017/025455, filed on Jul. 12, 2017.

(30) Foreign Application Priority Data

Jul. 15, 2016 (JP) .................. 2016-140808

(51) Int. Cl.
*H02K 3/28* (2006.01)
*H02K 3/50* (2006.01)
(Continued)

(52) U.S. Cl.
CPC .............. *H02K 3/28* (2013.01); *H02K 1/16* (2013.01); *H02K 3/04* (2013.01); *H02K 3/12* (2013.01);
(Continued)

(58) Field of Classification Search
CPC .. H02K 3/04; H02K 3/28; H02K 3/12; H02K 3/50; H02K 1/16; H02K 2203/06; H02K 2203/09
(Continued)

(56) References Cited

U.S. PATENT DOCUMENTS

2014/0210298 A1* 7/2014 Tamura ................ H02K 3/12
310/198
2015/0022047 A1* 1/2015 Shibata ................ H02K 3/28
310/208
(Continued)

FOREIGN PATENT DOCUMENTS

JP 2012-095480 A 5/2012

*Primary Examiner* — Thomas Truong
(74) *Attorney, Agent, or Firm* — Oliff PLC

(57) ABSTRACT

Each of phase windings includes parallel windings for each phase connected together in parallel, and the parallel windings include power-wire partial windings connected to a power supply side, neutral-line partial windings connected to a neutral point, and at least one of a set of 5-pitch and 7-pitch jumper wires, the power-wire partial windings, the neutral-wire partial windings, and the jumper wires being included in the plurality of partial windings forming the parallel windings. For two of the three phases, each of the 5-pitch jumper wires and a corresponding one of the 7-pitch jumper wires overlap each other, and for the remaining single phase, two of the 5-pitch jumper wires are spaced from each other in the circumferential direction, and each of the power-wire partial windings is adjacent to another power-wire partial winding for an identical phase or to a corresponding one of the neutral-line partial windings for a different phase.

6 Claims, 12 Drawing Sheets

(51) Int. Cl.
 *H02K 3/04* (2006.01)
 *H02K 1/16* (2006.01)
 *H02K 3/12* (2006.01)

(52) U.S. Cl.
 CPC ........... *H02K 3/50* (2013.01); *H02K 2203/06* (2013.01); *H02K 2203/09* (2013.01)

(58) Field of Classification Search
 USPC .................. 310/71, 179, 180, 195, 198, 208
 See application file for complete search history.

(56) References Cited

U.S. PATENT DOCUMENTS

2015/0076953 A1 3/2015 Tamura
2017/0271937 A1 9/2017 Takei

* cited by examiner

STATOR OF ROTATING ELECTRIC MACHINE

CROSS-REFERENCE TO RELATED APPLICATION

The present application is based on and claims the benefit of priority from earlier Japanese Patent Application No. 2016-140808 filed Jul. 15, 2016, the contents of which are incorporated herein by reference.

TECHNICAL FIELD

The present disclosure relates to a stator of a rotating electric machine.

BACKGROUND

Among rotating electric machines mounted in a vehicle for use, some generally known rotating electric machines include a rotatable rotor and a stator arranged opposite to the rotor in a radial direction. The stator includes a stator core including a plurality of slots aligned in a circumferential direction and stator windings wound through the plurality of slots in the stator core.

SUMMARY

In the present disclosure, there is provided a stator of a rotating electric machine including an annular stator core including a plurality of slots arranged in a circumferential direction at a ratio of two slots per phase and per pole and stator lead wires including phase windings for three phases wound through the slots. For two of the three phases, each of 5-pitch jumper wires and a corresponding one of 7-pitch jumper wires overlap each other, and for the remaining single phase, two of the 5-pitch jumper wires are spaced from each other in the circumferential direction.

BRIEF DESCRIPTION OF THE DRAWINGS

The above-described and other objects, features, and advantages of the present disclosure will become more apparent from the detailed description below with reference to the attached drawings.

In the accompanying drawings:

FIG. 18(a) is a diagram illustrating arrangement of jumper wires in a slot outermost layer; and FIG. 18(b) is a diagram illustrating arrangement of power wires and neutral wires in a slot innermost layer.

DETAILED DESCRIPTION OF THE PREFERRED EMBODIMENTS

The inventor of the present disclosure has studied a stator of a rotating electric machine mounted in a vehicle or the like and used as an electric motor or a generator.

Figure 12A:
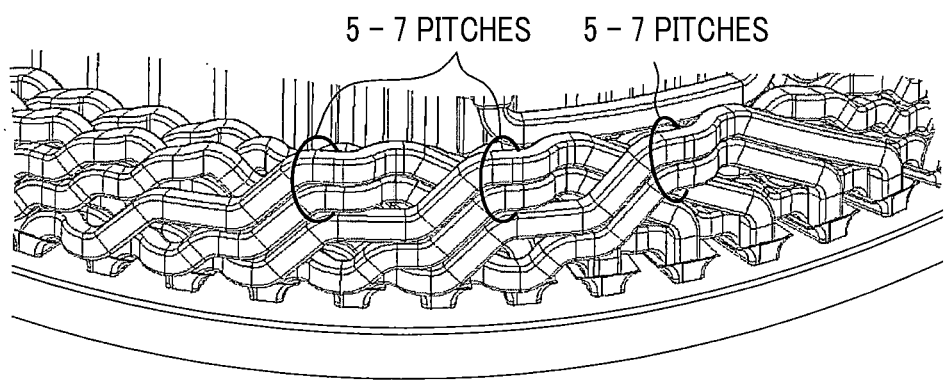
FIGS. 12(a) and 12(b) are partial perspective views of a stator in a comparative example.
Figure 12B:
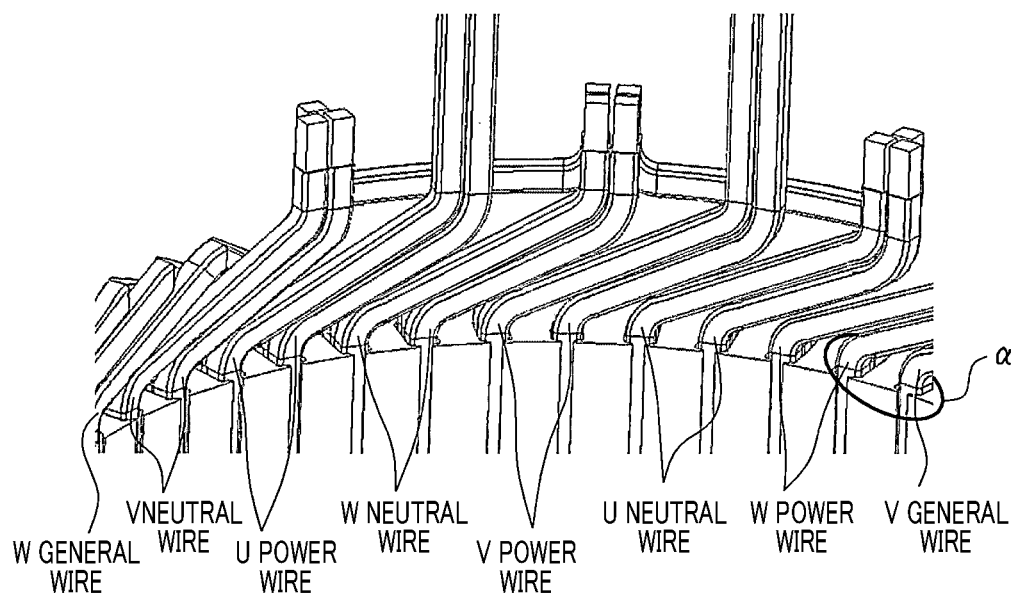

In the related art, a configuration of a rotating electric machine is known that includes, as stator windings, three sets of phase windings for the respective phases (U phase, V phase, and W phase) with two parallel windings electrically connected in parallel in each set, the three sets of parallel windings being connected together in a star form. Thus, in a configuration including, as phase windings, sets of two parallel windings, the sets of parallel windings are wound in a predetermined order such that the two windings for an identical phase are wound through corresponding adjacent slots in the stator core. To balance circulating currents through the parallel windings for each phase, the parallel windings are desirably evenly arranged in the two adjacent slots. Thus, for the parallel windings for each phase, jumper wires are used to change the wirings in two adjacent slots to each other between the parallel windings at an intermediate position between a start point and an end point of each winding As described above, in the configuration including the sets of two parallel windings, power wires for one phase are each adjacent to a corresponding partial winding for a different phase at a coil end portion of the stator. This may lead to an increased difference in potential between the windings. Specifically, in a configuration in which power wires for each phase are arranged in two adjacent slots and neutral wires for each phase are arranged in two adjacent slots between two sets of power wires for different phases, V neutral wires, U power wires, W neutral wires, V power wires, U neutral wires, and W power wires are arranged in this order in the circumferential direction of the stator core. A general winding (V general wire) may further be arranged adjacent to the W power wires (see a portion a in FIG. 12(b)). In such a case, the adjacency between the W power wire and the V general wire increases the potential difference between the different phases, possibly degrading insulation.

In view of this problem, a main object of the present disclosure is to provide a stator of a rotating electric machine capable of achieving enhanced insulation in stator windings.

Means for solving the problem and advantageous effects of the means will be described below.

A first aspect of the disclosure provides a stator of a rotating electric machine including an annular stator core including a plurality of slots arranged in a circumferential direction at a ratio of two slots per phase and per pole and stator lead wires including phase windings for three phases wound through the slots. Each of the phase windings is formed by parallel windings for each phase being connected together in parallel. The parallel windings for each phase include power-wire partial windings connected to a power supply side, neutral-line partial windings connected to a neutral point, and at least one of a set of 5-pitch jumper wires bridged at 5 slot pitches in the circumferential direction and each positioned between the corresponding power-wire partial winding and the corresponding neutral-line partial winding and a set of 7-pitch jumper wires bridged at 7 slot pitches in the circumferential direction and each positioned between the corresponding power-wire partial winding and the corresponding neutral-line partial winding; the power-wire partial windings, the neutral-wire partial windings, and the jumper wires being included in the plurality of partial windings forming the parallel windings. For two of the three phases, each of the 5-pitch jumper wires and a corresponding one of the 7-pitch jumper wires overlap each other, and for the remaining single phase, two of the 5-pitch jumper wires are spaced from each other in the circumferential direction. Each of the power-wire partial windings is adjacent to another power-wire partial winding for an identical phase or to the corresponding neutral-line partial winding for a different phase. In a second aspect of the disclosure, for two of the three phases, each of the 5-pitch jumper wires and a corresponding one of the 7-pitch jumper wires overlap each other in an axial direction, and for the remaining single phase, two of the 5-pitch jumper wires are spaced from each other in the circumferential direction.

In the stator core of the stator, the plurality of slots are arranged in the circumferential direction at a rate of two slots per phase and per pole. Furthermore, each of the phase windings as stator windings includes the parallel windings for the corresponding phase. In such a configuration, a jumper wire structure for each phase is such that, for two of the three phases, each 5-pitch jumper wire and the corresponding 7-pitch jumper wire are arranged to overlap each other in the axial direction and that, for the remaining single phase, the two 5-pitch jumper wires are spaced from each other in the circumferential direction. That is, only for a single phase, the two 5-pitch jumper wires are distributively arranged in the circumferential direction. As a result, each of the power-wire partial windings for each phase is adjacent to another power-wire partial winding for the identical phase or to the corresponding neutral-line partial winding for a different phase.

According to the above-described configuration, the arrangement of the jumper wires for each phase inhibits each of the power-wire partial windings for each phase from being adjacent to a partial winding for a different phase (except for the neutral-line partial windings) and thus suppresses a significant potential difference between the power-wire partial winding and the adjacent wire. As a result, enhanced insulation can be achieved in the stator windings.

In a third aspect of the disclosure, a coil end portion on an end surface side of the stator core is provided with two neutral-line connection portions to which three of the neutral-line partial windings for different phases are connected.

In the configuration in which the parallel windings for each phase are connected together in parallel to form the phase windings for each phase, the two neutral-line connection portions simplify routing of the partial windings and bus bars when the neutral wires are connected together to form neutral points.

In this case, for two of the three phases, each 5-pitch jumper wire and the corresponding 7-pitch jumper wire are arranged to overlap each other in the axial direction, and for the remaining single the two 5-pitch jumper wires are spaced from each other in the circumferential direction, as described above. Thus, the neutral-line partial winding for one phase is sandwiched between the neutral-line partial windings for the different phases in the circumferential direction. For example, compared to a configuration in which, for all of the three phases, each 5-pitch jumper wire and the corresponding 7-pitch jumper wire are arranged to overlap each other in the axial direction, that is, a configuration including no phase in which two 5-pitch jumper wires are distributively arranged, the present configuration enables a reduction in the number of crossings between the neutral wires at the coil end portion. This effectively allows simplification of the neutral wire structure and suppression of insufficient insulation of the crossing between the neutral wires.

In a fourth aspect of the present disclosure, at the coil end portion on the end surface side of the stator core, the adjacent neutral-line partial windings for the identical phase distributively extend in the circumferential direction, and tips of the neutral-line partial windings are connected together at a corresponding one of the neutral-line connection portions.

In the configuration including the two neutral-line connection portions, the adjacent neutral-line partial windings for the identical phase distributively extend in the circumferential direction, and the tips of the neutral-line partial windings are connected together at the corresponding neutral-line connection portion. This enables a further reduction in the number of crossings between the neutral wires at the coil end portion.

In a fifth aspect of the present disclosure, the stator includes two bus bars connecting the neutral-line partial windings for at least two different phases included in the neutral-line partial windings of the parallel windings for each phase. The neutral-line bus bars are connected to the neutral-wire partial windings such that different combinations of the neutral-wire partial windings are connected to the respective neutral-wire bus bars and that the neutral-line partial windings for all the phases are included at the opposite ends of each of the neutral-line bus bars.

The neutral-line bus bars are connected to the neutral-wire partial windings such that different combinations of the neutral-wire partial windings are connected to the respective neutral-wire bus bars and that the neutral-line partial windings for all the phases are included at the opposite ends of each of the neutral-line bus bars. A current flowing from one phase to another phase is thus distributed, allowing suppression of an increase in current density. This restrains a possible flow of an excess current through each of the neutral-line bus bars. Possible inappropriate insulation resulting from overcurrent can consequently be inhibited.

In a sixth aspect of the present disclosure, the neutral-line partial windings of the parallel windings for each phase include a plurality of winding ends each of which is a combination of the neutral-line partial windings for two different phases. Each of the neutral-line bus bars connects the winding ends together and is connected to the winding ends such that different combinations of the neutral-line partial windings are connected to the respective neutral-wire bus bars and that the neutral-line partial windings for all the phases are included at the opposite ends of each of the neutral-wire bus bars.

Each of the plurality of winding ends is a combination of the neutral-line partial windings for two different phases.

Thus, in a case where a current flows between different phases, in addition to current-carrying paths through which the current flows via one of the neutral-line bus bars, and the other neutral-line bus bar, a current-carrying path through which the current flows via neither of the neutral-line bus bars is formed. This enables a further reduction in the current flowing through the neutral-line bus bars.

Hereinafter, embodiments will be described below in detail. Identical or equal components in the embodiments described below are denoted by identical reference signs in the figures. Duplicate descriptions of the components with the identical reference signs are avoided.

First Embodiment

Figure 1:
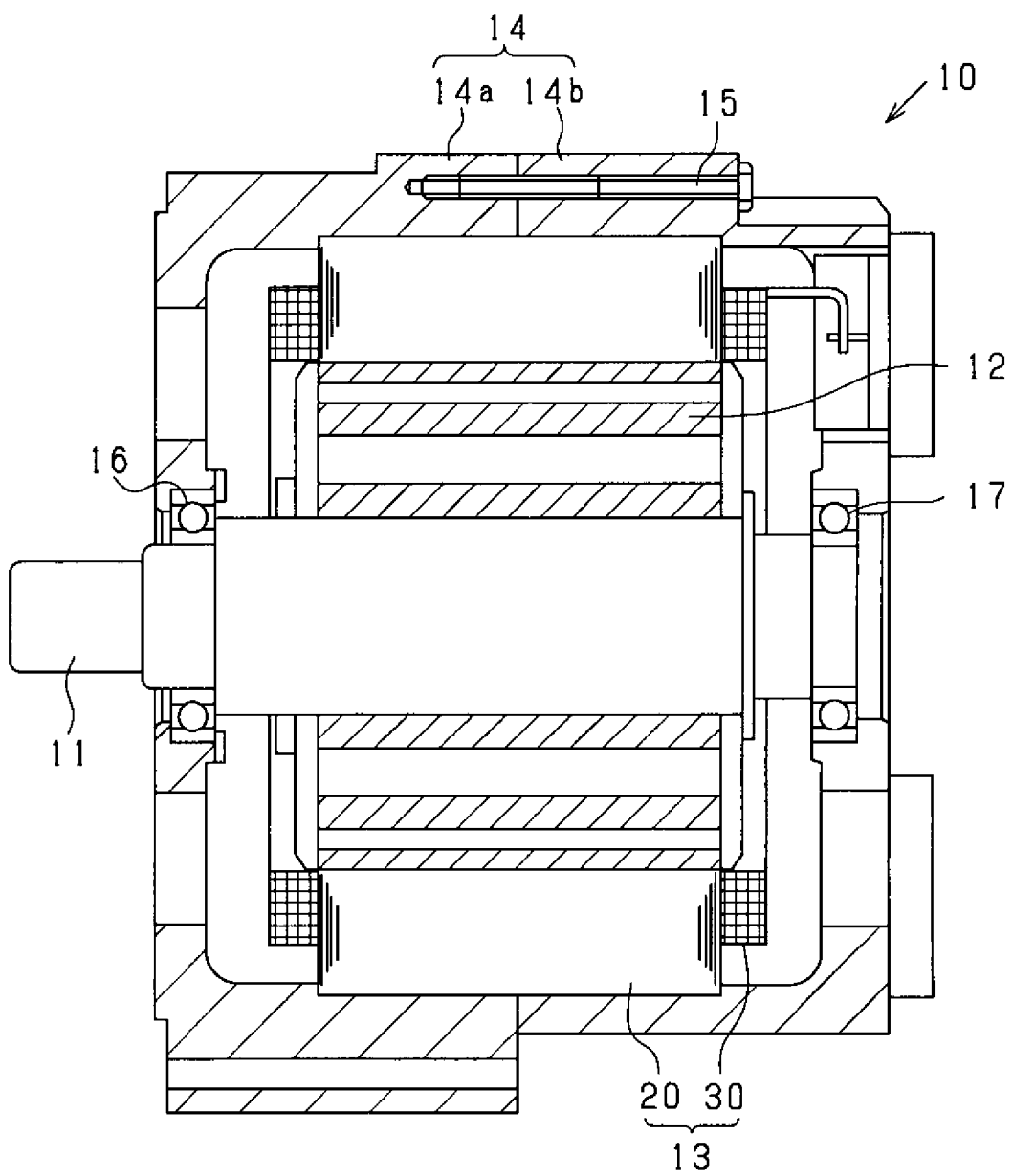
FIG. 1 is an axial cross-sectional view of a rotating electric machine equipped with a stator according to a first embodiment.

A rotating electric machine 10 according to a first embodiment is used as an AC generator for vehicles. As illustrated in FIG. 1, the rotating electric machine 10 includes a rotor 12 fixed to a rotating shaft 11, a stator 13 positioned to surround the rotor 12, and a housing 14 that houses the rotor 12 and the stator 13. The housing 14 includes a pair of housing members 14a and 14b shaped like bottomed tubes. The housing members 14a and 14b are integrally fastened to each other with bolts 15, with openings of the housing members 14a and 14b joined together.

The housing 14 is provided with bearings 16, 17 rotatably bearing the rotating shaft 11 and the rotor 12. The rotor 12 includes a plurality of magnetic poles arranged on an outer peripheral side of the stator 13 opposite to an inner peripheral side of the stator 13 in a radial direction. The magnetic poles are arranged at a predetermined distance from one another such that the different polarities alternate with one another. The magnetic poles are formed of a plurality of permanent magnets embedded at predetermined positions on the rotor 12. The number of magnetic poles in the rotor 12 varies among rotating electric machines and is thus not limited. In the first embodiment, a rotor with eight poles (four N poles and four S poles) is used.

Figure 2:
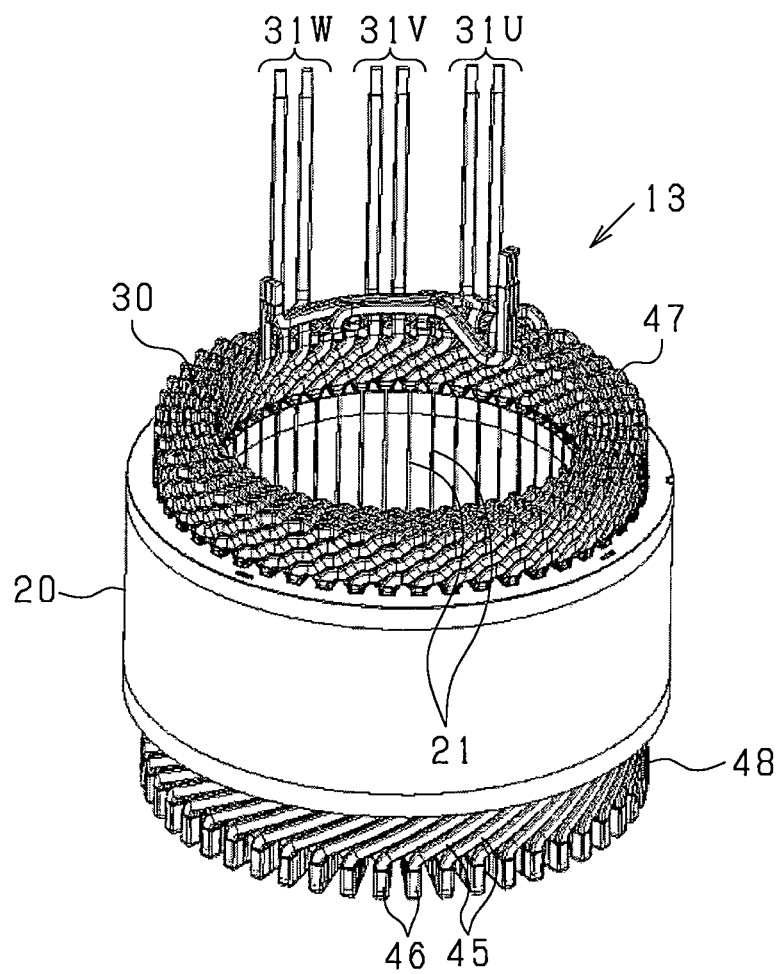
FIG. 2 is a perspective view illustrating the stator as a whole.
Figure 3:
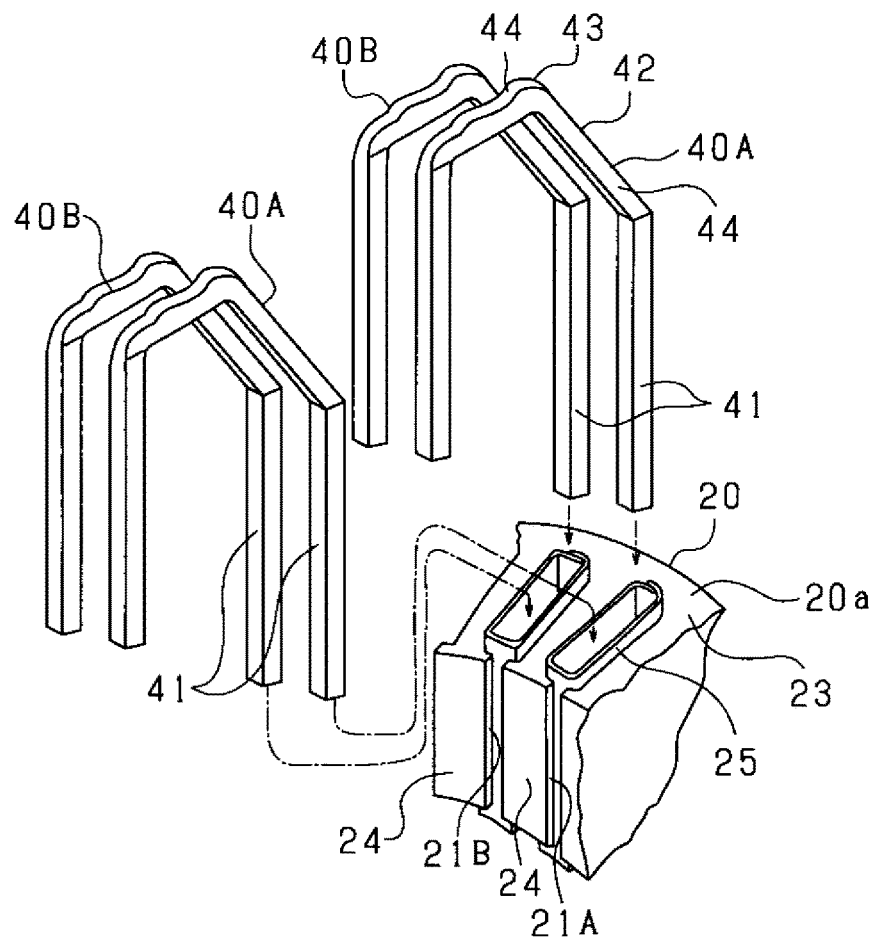
FIG. 3 is a diagram illustrating that conductor segments are inserted into a stator core.

Now, the stator 13 will be described. As illustrated in FIG. 2 and FIG. 3, the stator 13 includes a ring-shaped stator core 20 including a plurality of slots 21 in a circumferential direction and stator windings 30 for three phases (U phase, V phase, and W phase) wound through the slots 21 in the stator core 20 in a distributed manner.

The stator core 20 is of an integral type formed by laminating a plurality of ring-shaped electromagnetic steel plates onto one another in an axial direction of the stator core 20. The stator core 20 includes a ring-shaped back core 23 and a plurality of teeth 24 protruding radially inward from the back core 23 and aligned at a predetermined distance from one another in the circumferential direction. Each of the slots 21 is formed between the adjacent teeth 24. The number of slots 21 formed in the stator core 20 is such that, with respect to the number of the N and S magnetic poles of the rotor 12 (eight magnetic poles), two slots 21 are formed per phase of the stator windings 30. In the first embodiment, 8×3×2=48 and 48 slots are thus formed. The 48 slots 21 include U phase slots, V phase slots, and W phase slots, and two slots for each phase are repeatedly arranged in the circumferential direction.

Each of the stator windings 30 is configured using a plurality of U-shaped conductor segments 40. Each of the conductor segments 40 includes a pair of parallel linear portions 41 and a turn portion 42 coupling first ends of the pair of linear portions 41. The pair of linear portions 41 has a length larger than an axial thickness of the stator core 20. The turn portion 42 includes a vertex stage portion 43 provided in a central portion of the turn portion 42 and extending along an end surface 20a of the stator core 20, and inclined portions 44 provided on opposite sides of the top stage portion 43 to incline at a predetermined angle to the end surface 20a of the stator core 20. Reference numeral 25 represents an insulator that electrically insulates the stator core 20 from the stator windings 30.

Figure 4:
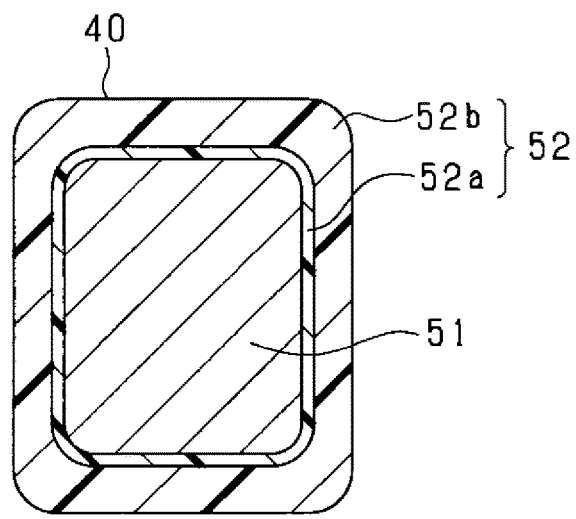
FIG. 4 is a cross-sectional view of a lead wire material forming a winding.

As illustrated in FIG. 4, the conductor segment 40 is formed by bending, into a U shape, a lead wire material (rectangular wire) including a copper conductor 51 with a rectangular cross section and an insulating film 52 covering an outer peripheral surface of the conductor. The insulating film 52 includes an inner layer 52a covering an outer periphery of the conductor 51 and an outer layer 52b covering an outer periphery of the inner layer 52a. A thickness of the insulating film 52, including the inner layer 52a and the outer layer 52b, is set to a value within a range from 100 μm to 200 μm. As described above, the insulating film 52, including the inner layer 52a and the outer layer 52b, has a large thickness, eliminating a need to sandwich an insulating sheet or the like between the conductor segments 40 for insulation. However, the insulating film 52 may have a single layer structure instead of a multilayer structure.

As illustrated in FIG. 3, the stator core 20 is provided with sets each of two slots 21A and 21B for an identical phase, and the two slots 21A and 21B in each set are adjacent to each other in the circumferential direction. A set of two conductor segments 40A and 40B are inserted and arranged in the slots 21A and 21B. In this case, the linear portions 41 of the two conductor segments 40A and 40B are separately inserted into the respective adjacent slots 21A and 21B, instead of the identical slot 21, from an axially first end side (an upper side in FIG. 3). That is, for the conductor segment 40A, one of the two conductor segments 40A and 40B on a right side in FIG. 3, one of the linear portions 41 is inserted into an outermost layer (eighth layer) of the slot 21A, and the other linear portion 41 is inserted into a seventh layer of another slot 21A (not illustrated in the drawings) located one magnetic pole pitch (six slot pitch) away from the above-described slot 21A, counterclockwise in the stator core 20.

Figure 5:
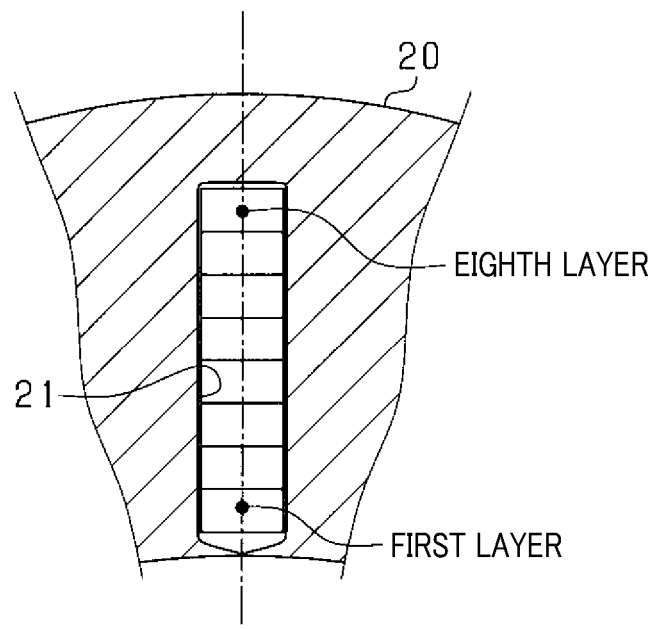
FIG. 5 is a partial cross-sectional view of the stator.

For the conductor segment 40B, one of the linear portions 41 is inserted into an outermost layer (eighth layer) of the slot 21B, located adjacent to the slot 21B, and the other linear portion 41 is inserted into a seventh layer of another slot 21B (not illustrated in the drawings) located one magnetic pole pitch (six slot pitch) away from the above-described slot 21B, counterclockwise in the stator core 20. That is, the two conductor segments 40A and 40B are arranged one slot pitch away from each other in the circumferential direction. As described above, the linear portions 41 of an even number of conductor segments 40 are inserted and arranged in all the slots 21. In the first embodiment, a total of eight linear portions 41 are housed in each slot 21 in such a manner as to align in line in the radial direction as illustrated in FIG. 5.

Tips of the pair of linear portions 41 extending from the slots 21 toward an axially second end (a lower side in FIG. 3) are twisted toward opposite sides in the circumferential direction in such a manner as to skew at a predetermined angle to the end surface 20a of the stator core 20, forming twisted portions 45 (see FIG. 2) with a length equal to approximately half the magnetic pole pitch. At an axially second end side of the stator core 20, tips of the twisted portions 45 of every two layers of conductor segments 40 are joined together, for example, by welding to electrically connect the conductor segments 40 in a predetermined pattern. In other words, in the stator 13, in which the paired linear portions 41 of each conductor segment 40 are arranged in the corresponding adjacent layers in the radial direction, the twisted portions 45 extending toward the circumferentially opposite sides between the corresponding layers are formed to consecutively connect the conductor segments 40 together. In this case, predetermined conductor segments 40 are connected together in series to electrically connect an m-th layer (m is a natural number of 1 or larger) slot housed portion (linear portion 41) to an (m+1)-th layer slot housed portion (linear portion 41), the slot housed portion being housed in each slot 21. Phase windings 31U, 31V, and 31W are thus wave-wound along the slots 21 in the stator core 20 in the circumferential direction to form the stator windings 30.

Figure 6:
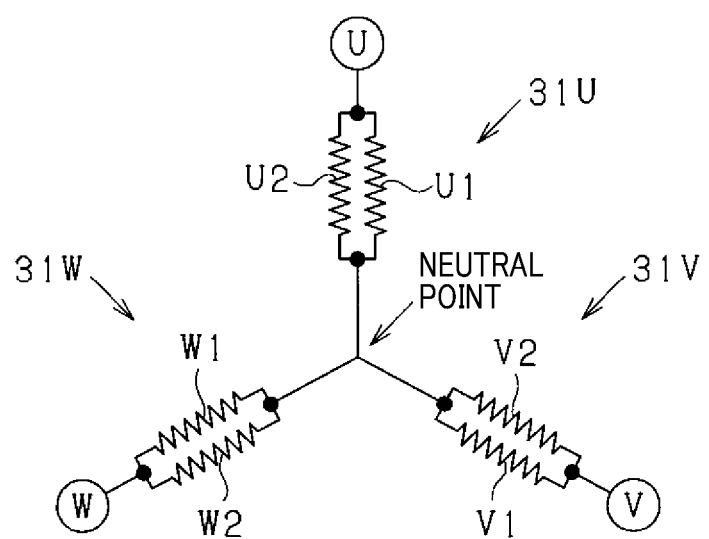
FIG. 6 is a connection diagram of stator windings.

As illustrated in FIG. 6, the stator windings 30 include the phase winding 31U including two parallel windings U1 and U2 connected in series, the phase winding 31V including two parallel windings V1 and V2 connected in series, and the phase winding 31W including two parallel windings W1 and W2 connected in series. The phase windings 31U, 31V, and 31W are connected together in a star form. In this case, the ends of the phase windings 31U, 31V, and 31W are connected together to form neutral points.

Each of the parallel windings U, U2, V1, V2, W1, and W2 has a length equal to two circumferences of the stator core 20 and wound between the innermost layer and the outermost layer of the slot 21 in each section of the first circuit and the second circuit. For the stator windings 30, a plurality of conductor segments 40 bridged at 6 slot pitches are basically used to form windings (coils) circling the stator core 20 eight times in the circumferential direction.

With the stator windings 30 wound in the stator core 20, the plurality of turn portions 42 protrude, through the slots 20, out from the end surface 20a at the axially first end side of the stator core 20. Thus, the turn portions 42, when taken as a whole, form a ring-shaped first coil end portion 47 (see FIG. 2). Furthermore, the plurality of twisted portions 45 and terminal junctions 46 protrude out from the end surface at the axially second end side of the stator core 20. Thus, the twisted portions 45 and the terminal junctions 46, when taken as a whole, form a ring-shaped second coil end portion 48 (see FIG. 2). At the first coil end portion 47, the turn portions 42 of the conductor segments 40 electrically connect the slots together at 6 slot pitches. At the second coil end portion 48, the twisted portions 45 and the terminal junctions 46 electrically connect the slots together at 6 slot pitches.

Figure 7:
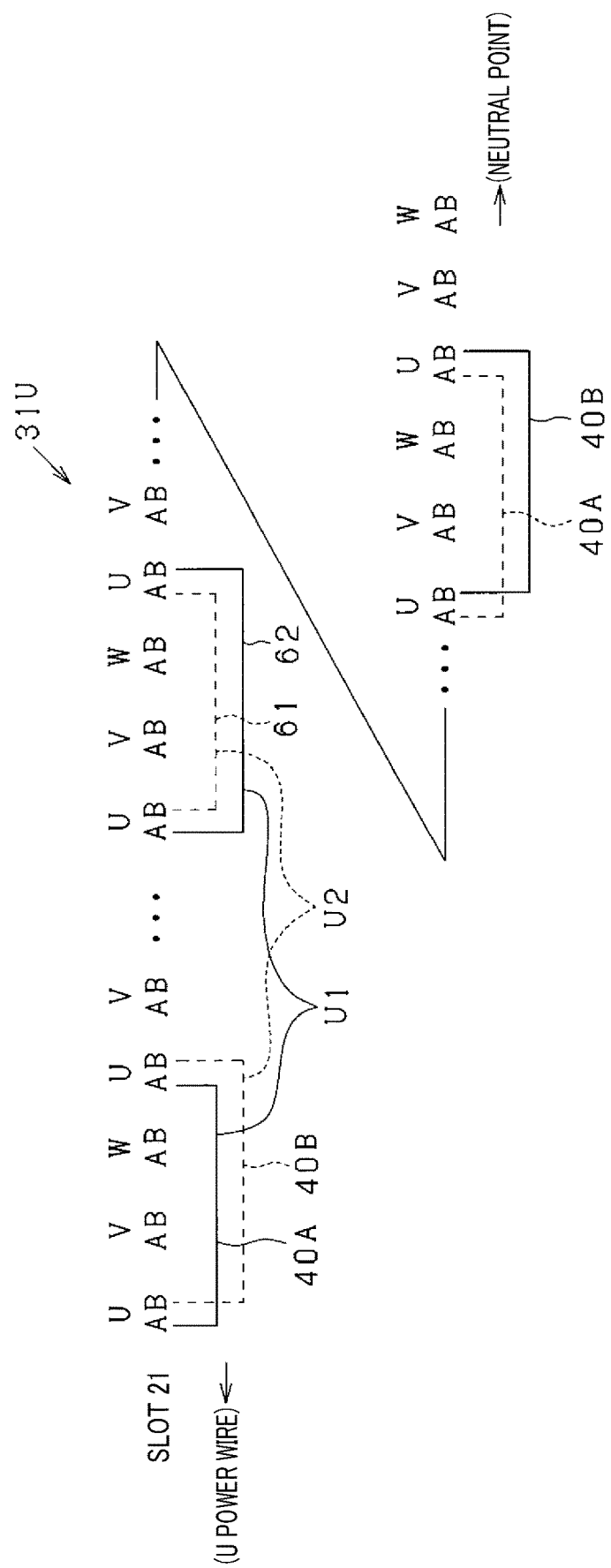
FIG. 7 is a diagram illustrating winding specifications for phase windings.

Winding specifications for the stator windings 30 will be described below with reference to FIG. 7 and FIG. 8. FIG. 7 linearly illustrates the slots 21 arranged in the circumferential direction for convenience. For the winding 31U for the U phase, one of the three phases, the partial windings forming the parallel windings U1 are illustrated by solid lines, and the partial windings forming the parallel windings U2 are illustrated by dashed lines.

As illustrated in FIG. 7, the stator core 20 is provided with the sets of two slots 21 for each phase per phase and per pole, the sets of slots 21 being consecutively arranged in the circumferential direction. That is, the stator core 20 is provided with the sets of two adjacent slots A and B for each phase such that the sets of slots A and B for each phase are repeatedly provided at intervals of six slots. The plurality of conductor segments 40 are inserted into the slots A and B for each phase as the partial windings to form the phase windings 31U, 31V, and 31W. In the first embodiment, the conductor segments 40A and 40B are provided in parallel for each phase to form the parallel windings for each phase U1 and U2, V1 and V2, and W1 and W2.

For example, for the U phase, each of the conductor segments 40A is inserted between the slots A and A, while each of the conductor segments 40B is inserted between the slots B and B. The conductor segments 40A and 40B are provided to straddle the corresponding slots at 6 slot pitches in the circumferential direction, forming partial windings in general portions.

To balance a circulating current between each of the pairs of parallel windings U1 and U2, V1 and V2, and W1 and W2, the parallel windings in each pair U1 and U2, V1 and V2, and W1 and W2 are desirably evenly arranged in the slots A and B with a balance between the slots A and the slots B. Thus, in the first embodiment, at an intermediate position between a power wire and a neutral point, the slots A and B are changed to each other between the parallel windings U1 and U2, between the parallel windings V1 and V2, and between the parallel windings W1 and W2 to provide the identical parallel windings with a mixture of the conductor segments 40A each provided between the slots A and A and the conductor segments 40B each provided between the slots B and B.

To change the slots A and B to each other, deformed segments shaped differently from the conductor segments 40 are used as jumper wires. For example, a set of jumper wires for the U phase winding 31U includes 5-pitch jumper wires 61 straddling the corresponding slots at 5 slot pitches in the circumferential direction and 7-pitch jumper wires 62 straddling the corresponding slots at 7 slot pitches in the circumferential direction. In this case, each of the jumper wires 61 and 62 is arranged to straddle the slots between the U phase slot A and the U phase slot B. Although not illustrated in the drawings in detail, each of the jumper wires 61 and 62 is a segment formed by bending the same lead wire material as that for the conductor segments 40 into a U shape, and includes, like the conductor segments 40, a pair of linear portions inserted into the slots and a turn portion coupling first ends of the pair of linear portions together (this also applies to 5-pitch jumper wires 63 described below).

Thus, in the parallel windings U1 illustrated by solid lines in FIG. 7, the partial winding is formed of the conductor segment 40A arranged between the slots A and A on a left side (power wire side) of the 7-pitch jumper wire 62, whereas the partial winding is formed of the conductor segment 40B arranged between the slots B and B on a right side (neutral point side) of the 7-pitch jumper wire 62. In the parallel windings U2 illustrated by dashed lines in FIG. 7, the partial winding is formed of the conductor segment 40B arranged between the slots B and B on a left side (power wire side) of the 5-pitch jumper wire 61, whereas the partial winding is formed of the conductor segment 40A arranged between the slots A and A on a right side (neutral point side) of the 5-pitch jumper wire 61.

Figure 8:
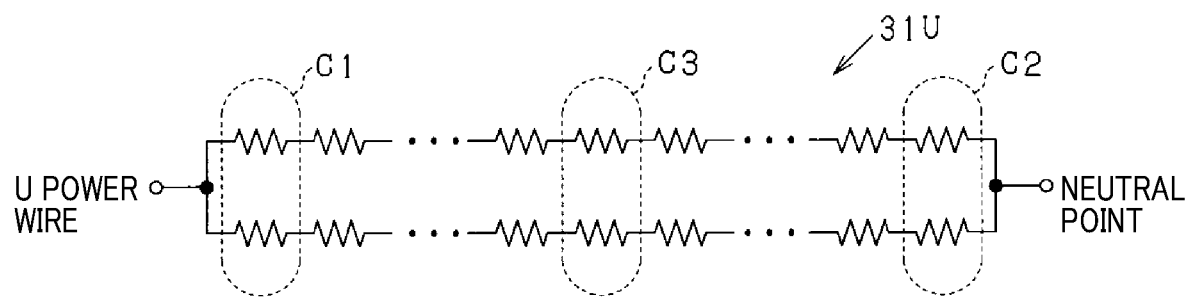
FIG. 8 is a connection diagram illustrating partial windings of the phase windings.

In addition, as illustrated in FIG. 8, the parallel windings U1 and U2 for the U phase include power-wire partial windings C1 included in the plurality of partial windings and connected to the power supply side and neutral-wire partial windings C2 included in the plurality of partial windings and connected to the neutral point, with jumper wires C3 provided at an intermediate position between the power-wire partial windings C1 and the neutral-wire partial windings C2. In this case, as the jumper wires C3, the 5-pitch jumper wire 61 is used for one of the parallel windings U1 and U2, and the 7-pitch jumper wire 62 is used for the other.

The parallel windings U1 and U2 are wound through the slots 21 in the stator core 20 as described below. For example, in a case where a start point is the innermost layer in the slot 21, the conductor segments 40 are placed in the circumferential direction while the slot layer is gradually shifted from the innermost layer toward the outermost layer. In the outermost layer, the jumper wires 61 and 62 are used to reverse the circumferential direction, and the conductor segments 40 are placed in the circumferential direction while the slot layer is gradually shifted from the outermost layer toward the innermost layer. At this time, the paired linear portions of each of the 5-pitch jumper wires 61 and the 7-pitch jumper wires 62 are inserted into the slot outermost layer (eighth layer). In other words, the jumper wires 61 and 62 for the different layers are arranged in the slot outermost layer to overlap one another in the axial direction (see FIG. 9).

In contrast, the start point and an end point may be the slot outermost layer. In such a case, the jumper wires 61 and 62 are arranged in the slot innermost layer (first layer) to overlap one another in the axial direction.

Each of the parallel windings U1, U2, V1, V2, W1, and W2 is provided to circuit the stator core 20 twice. The parallel winding circuits the stator core 20, for example, clockwise starting from the start point side, is inverted by the jumper wires 61 and 62 at a position where one circuit from the start point completes, and then circuits the stator core 20 counterclockwise to the end point. In this case, the jumper wires 61 and 62 form winding inversion portions reversing a circumferential direction of the windings.

Figure 9:
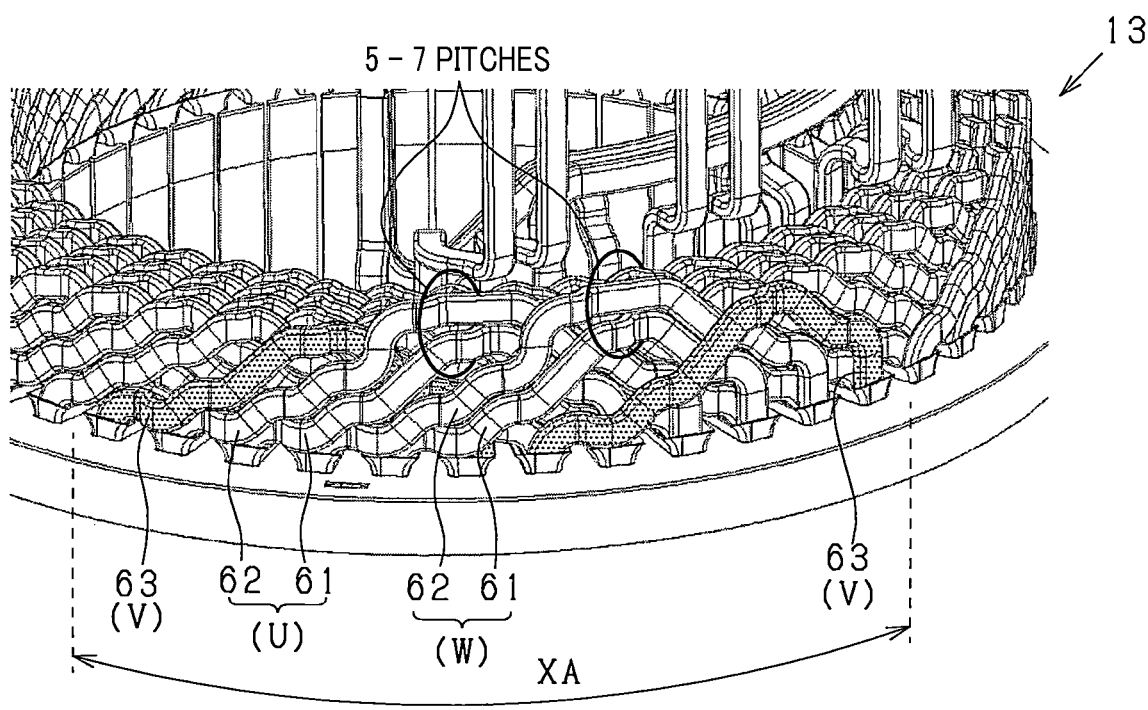
FIG. 9 is a partial perspective view of the stator.

Furthermore, in the first embodiment, for the phase windings for two of the three phases, included in the three-phase windings 31U, 31V, and 31W, each 5-pitch jumper wire 61 and the corresponding 7-pitch jumper wire 62 are arranged to overlap each another in the axial direction. For the phase windings for the remaining single phase, two 5-pitch jumper wires are spaced from each other in the circumferential direction. That is, in FIG. 9 illustrating the stator core 20 as viewed from the outer peripheral side, a section XA is a section where the jumper wires for each phase (six jumper wires) are arranged in the slot outermost layer. In the section XA, for example, for the jumper wires for the U phase and the W phase, each 5-pitch jumper wire 61 and the corresponding 7-pitch jumper wire are arranged to overlap each other in the axial direction. For the jumper wires for the remaining V phase, the two 5-pitch jumper wires 63 are spaced from each other in the circumferential direction. In other words, for the V phase, the two 5-pitch jumper wires 63 are distributively arranged in the circumferential direction. In FIG. 9, the two 5-pitch jumper wires 63 for the V phase are dotted for convenience.

Figure 10:
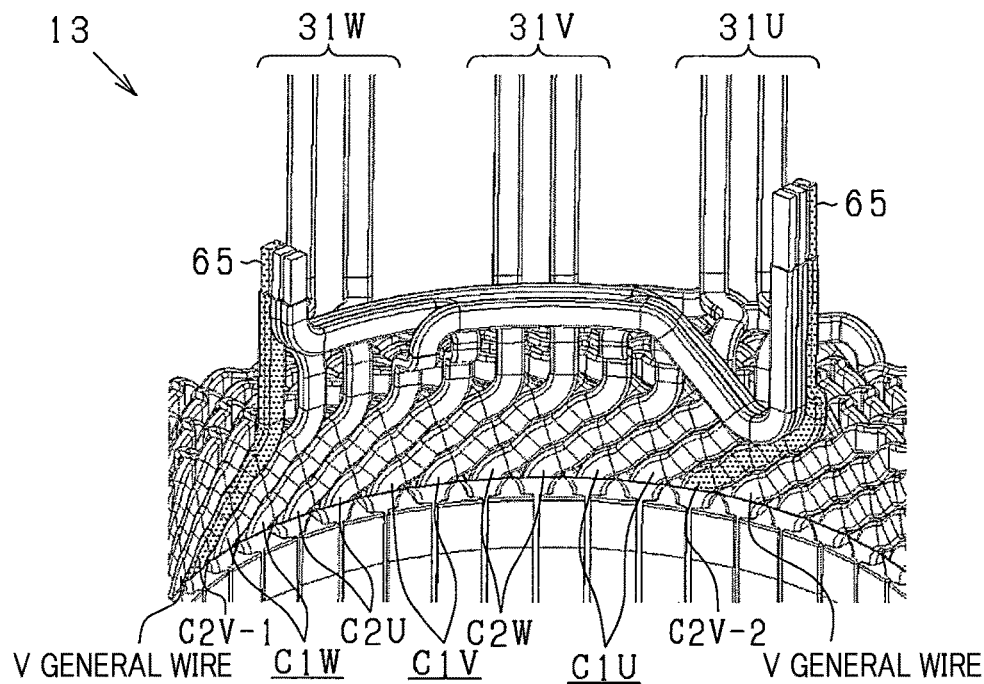
FIG. 10 is a partial perspective view of the stator.

In the stator core 20, the slots are sorted into the different phase by the jumper wires, and in the portions other than the jumper wire portions, the conductor segments 40 are consecutively bridged at regular pitches (6 slot pitches). This determines circumferential slot positions (slot numbers) of the power wires and the neutral wires in the slot innermost layer. In the first embodiment, the jumper wires for each phase are arranged as illustrated in FIG. 9 to determine the circumferential slot positions of the power wires and the neutral wires as illustrated in FIG. 10. In this case, the power wire for each phase is arranged at one coil end portion (first coil end portion 47) to protrude out in the axial direction. More specifically, for power-wire partial windings C1U, C1V, and C1W respectively included in partial windings of the phase windings 31U, 31V, and 31W and connected to the power supply side, the power-wire partial windings for an identical phase (parallel windings for the identical phase) are arranged adjacent to one another in the circumferential direction.

Neutral-wire partial windings C2U, C2V, and C2W respectively included in the partial windings of the phase windings 31U, 31V, and 31W and connected to the neutral points are drawn out in the axial direction. The neutral-wire partial windings for the different phases are arranged in proximity to one another at the draw-out portion, and ends of the neutral-wire partial windings are integrally coupled together by welding or the like. The neutral-wire partial windings C2U, C2V, and C2W are divided into two sets. In each of the two sets, the ends of neutral-wire partial windings for the three phases are coupled together. In other words, at the first coil end portion 47, a neutral-wire connection portion 65 to which three neutral-wire partial windings for the different phases are connected is provided at two circumferentially spaced positions. The power-wire partial windings C1U, C1V, and C1W and the neutral-wire partial windings C2U, C2V, and C2W are also formed of the same lead wire material as that for the conductor segments 40.

In the slot innermost layer, for the neutral-wire partial windings C2U and C2W for the U phase and the W phase, included in the neutral-wire partial windings C2U, C2V, and C2W for all the phases, the neutral-wire partial windings for the identical phase (parallel windings for the identical phase) are arranged adjacent to each other. However, the neutral-wire partial windings for the V phase C2V (C2V-1 and C2V-2) are spaced from each other in the circumferential direction, specifically, arranged 11 slot pitches away from each other in the circumferential direction. This is based on the arrangement in which two 5-pitch jumper wires 63 are spaced from each other in the circumferential direction as the jumper wires for the V phase and in which the conductor segments 40 are consecutively bridged at regular pitches (6 slot pitches) between each jumper wire and the corresponding neutral-wire partial winding.

In a case where the power-wire partial windings for each phase C1U, C1V, and C1W and the neutral-wire partial windings C2U, C2V, and C2W for each phase are arranged as illustrated in FIG. 10, each of the power-wire partial windings C1U, C1V, and C1W is adjacent to another power-wire partial winding for the identical phase or to the corresponding neutral-wire partial winding for a different phase.

Figure 11A:
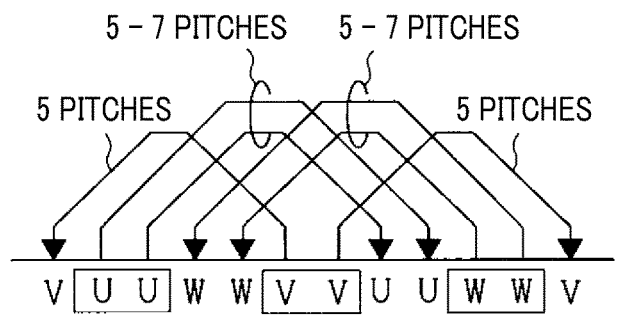
FIG. 11(a) is a diagram illustrating arrangement of jumper wires in a slot outermost layer.
Figure 11B:
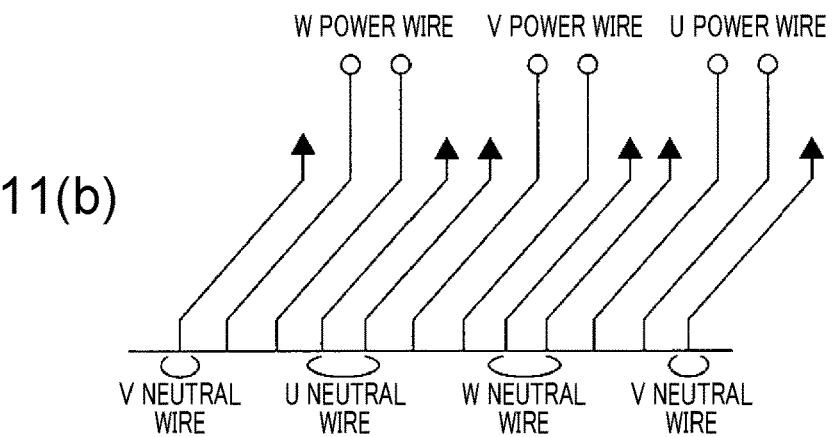
FIG. 11(b) is a diagram illustrating arrangement of power wires and neutral wires in a slot innermost layer.

FIG. 11(a) is a diagram illustrating arrangement of the jumper wires for each phase in the slot outermost layer as viewed from the outer peripheral side of the stator core 20. FIG. 11(b) is a diagram illustrating arrangement of the power wires and the neutral wires for each phase in the slot innermost layer as viewed from the inner peripheral side of the stator core 20. Among two adjacent phase indications (UU, VV, and WW) in FIG. 11(a), the phase indications enclosed by rectangular frames indicate slot positions connected to the power wire side for each phase (winding start point side). The phase indications unenclosed by rectangular frames indicate slot positions connected to the neutral-wire side for each phase (winding end point side).

As illustrated in FIG. 11(a), in the outermost layer of the slot, each 5-pitch jumper wire 61 and the corresponding 7-pitch jumper wire 62 for the U phase and the W phase are arranged to overlap each other in the axial direction, that is, in an up-down direction in FIG. 11(a), and the two 5-pitch jumper wires 63 for the remaining V phase are spaced from each other in the circumferential direction, that is, in a lateral direction in FIG. 11(a). In this case, an input side (winding start point side) arrangement of the jumper wires for each phase is "UU-VV-WW" from the left of FIG. 11(a). For the U phase and the W phases, corresponding to the outer opposite phases, each 5-pitch jumper wire 61 and the corresponding 7-pitch jumper wire 62 are arranged to overlap each other in the axial direction. For the V phase, corresponding to the central phase, two 5-pitch jumper wires 63 are spaced from each other in the circumferential direction.

As illustrated in FIG. 11(*b*), in the slot innermost layer, the neutral wires for the U phase and the W phase are arranged such that the neutral wires for the identical phase (the parallel windings for the identical phase) are adjacent to each other in the circumferential direction. In contrast, the neutral wires for the V phase are spaced from each other in the circumferential direction. Each of the power wires for each phase is adjacent to another power wire for the identical phase or to the corresponding neutral wire for a different phase. In this case, in terms of each power wire, the power wire is adjacent to another power wire for the identical phase on one side and to the corresponding neutral-wire for a different phase on the other side.

In an existing configuration as a stator core including parallel windings for each phase, jumper wires for each phase are configured such that, for all the phases, each 5-pitch jumper wire and the corresponding 7-pitch jumper wire are combined together in the slot outermost layer as illustrated in FIG. 12(*a*). Consequently, in the slot innermost layer, the power wires for each phase (U power wires, V power wires, and W power wires) are provided in two adjacent slots, and the neutral wires for each phase (U neutral wires, V neutral wires, and W neutral wires) are provided in two adjacent slots between the power wires for the different phase as illustrated in FIG. 12(*b*). In this case, in an a portion in FIG. 12(*b*), the W power wire is adjacent to a V general wire. This increases a potential difference between the wires for the different phases, possibly degrading an insulation property.

In contrast, in the stator structure in the first embodiment, the jumper wires for each phase are configured as illustrated in FIG. 9, and each power wire is adjacent to another power wire for the identical phase or to the corresponding neutral wire for a different phase. This suppresses a significant potential difference between the power wire and the adjacent wire, inhibiting degradation of the insulation property.

Figure 13A:
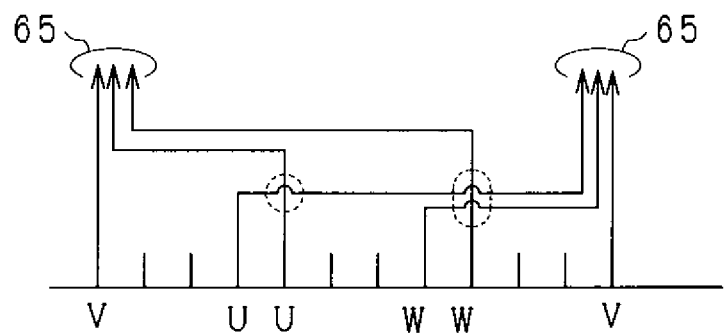
FIGS. 13(a) and 13(b) are diagrams illustrating routing of the neutral-line partial windings for each phase.
Figure 13B:
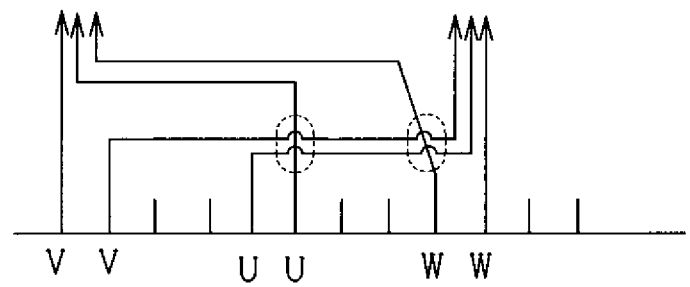

Furthermore, in the configuration illustrated in FIG. 10, at the first coil end portion 47, the neutral-wire connection portion 65 to which three neutral-wire partial windings for the different phases are connected is provided at two circumferentially spaced positions as described above. This is schematically illustrated in FIG. 13(*a*). In this case, the paired neutral-wire partial windings for the V phase are positioned to sandwich the set of the neutral-wire partial windings for the different phases (U phases and W phases) between the V phase neutral-wire partial windings, that is, positioned at the opposite sides of the set. Thus, compared to a configuration in which, for all of the three phases, each 5-pitch jumper wire and the corresponding 7-pitch jumper wire are arranged to overlap each other in the axial direction, that is, a configuration including no phase in which two 5-pitch jumper wires are distributively arranged, the present configuration enables a reduction in the number of crossings between the neutral wires at the coil end portion.

In other words, in the configuration in which, for all of the three phases, each 5-pitch jumper wire and the corresponding 7-pitch jumper wire are arranged to overlap each other in the axial direction, the neutral-wire partial windings for each phase are routed, for example, as illustrated in FIG. 13(*b*). In this case, in FIG. 13(*b*), the neutral wires cross one another at four points, whereas, in FIG. 13(*b*), the number of crossings between the neutral wires may be reduced to three.

The configuration in FIG. 10 may be partially changed. For example, at the first coil end portion 47, the adjacent neutral-wire partial windings for the identical phase are distributively extended in the circumferential direction, and tips of the neutral-wire partial windings are connected together at a corresponding one of the neutral-wire connection portions 65. In this case, as illustrated in FIG. 14(*a*), for the neutral-wire partial windings for the U phase and the W phase, included in the neutral-wire partial windings for all the phases, the adjacent neutral-wire partial windings distributively extend in the circumferential direction (the lateral direction in FIG. 14(*a*)), and the tips of the adjacent neutral-wire partial windings are connected together at a corresponding one of the neutral-wire connection portions 65. Thus, compared to the configuration in which, for all of the three phases, each 5-pitch jumper wire and the corresponding 7-pitch jumper wire are arranged to overlap each other in the axial direction (see FIG. 12(*a*)), the present configuration enables a reduction in the number of crossings between the neutral wires at the first coil end portion 47.

In other words, in the configuration in which, for all of the three phases, each 5-pitch jumper wire and the corresponding 7-pitch jumper wire are arranged to overlap each other in the axial direction, even when the adjacent neutral-wire partial windings are distributed in the circumferential direction as is the case with FIG. 14(*a*), the neutral-wire partial windings for each phase are routed, for example, as illustrated in FIG. 14(*b*). In this case, in FIG. 14(*b*), the neutral wires cross one another at three points, whereas, in FIG. 14(*a*), the number of crossings between the neutral wires may be reduced to one.

Compared to FIG. 13(*a*), FIG. 14(*a*) illustrates that the number of crossings between the neutral wires at the first coil end portion 47 may further be reduced.

According to the above-described first embodiment, the following excellent effects can be produced.

In the stator core 20, the plurality of slots 21 are arranged at a rate of two slots per phase and per pole in the circumferential direction. Furthermore, the phase windings 31U, 31V, and 31W as the stator windings 30 respectively include the parallel windings U1 and U2, V1 and V2, and W1 and W2 for the corresponding phases. In such a configuration, the jumper wire structure for each phase is such that, for two of the three phases, each 5-pitch jumper wire 61 and the corresponding 7-pitch jumper wire are arranged to overlap each other in the axial direction and that, for the remaining single phase, the two 5-pitch jumper wires 63 are spaced from each other in the circumferential direction. That is, only for one phase, the two 5-pitch jumper wires 63 are distributively arranged in the circumferential direction. As a result, each of the power-wire partial windings for each phase is adjacent to another power-wire partial winding for the identical phase or to the corresponding neutral-line partial winding for a different phase. According to the above-described configuration, the arrangement of the jumper wires for each phase inhibits each of the power-wire partial windings for each phase from being adjacent to a partial winding for a different phase (except for the neutral-line partial windings) and thus suppresses a significant potential difference between the power-wire partial winding and the adjacent wire. As a result, enhanced insulation can be achieved in the stator windings 30.

The power-wire partial windings have a higher voltage than any other partial windings of the phase windings 31U, 31V, and 31W, and may thus suffer electrical breakdown.

However, the above-described configuration may prevent possible electrical breakdown caused by a potential difference between the windings.

In the configuration in which the parallel windings for each phase U1 and U2, V1 and V2, and W1 and W2 are connected together in parallel to respectively form the phase windings 31U, 31V, and 31W, the neutral-wire connection portion 65 is provided at two points. This simplifies routing of the partial windings and the bus bars when the neutral wires are connected together to form neutral points.

In this case, for two of the three phases, each 5-pitch jumper wire 61 and the corresponding 7-pitch jumper wire 62 are arranged to overlap each other in the axial direction, and for the remaining single phase, the two 5-pitch jumper wires 63 are spaced from each other in the circumferential direction, as described above. Thus, as illustrated in FIG. 13(a), a pair of neutral-wire partial windings for one phase is positioned such that neutral-wire partial windings for the other phases are sandwiched between the pair of neutral-wire partial windings in the circumferential direction. For example, compared to the configuration in which, for all of the three phases, each 5-pitch jumper wire and the corresponding 7-pitch jumper wire are arranged to overlap each other in the axial direction (see FIG. 12(a)), that is, the configuration including no phase in which two 5-pitch jumper wires are distributively arranged, the present configuration enables a reduction in the number of crossings between the neutral wires at the coil end portion. This effectively allows simplification of the neutral wire structure and suppression of inappropriate insulation of the crossing between the neutral wires.

Figure 14A:
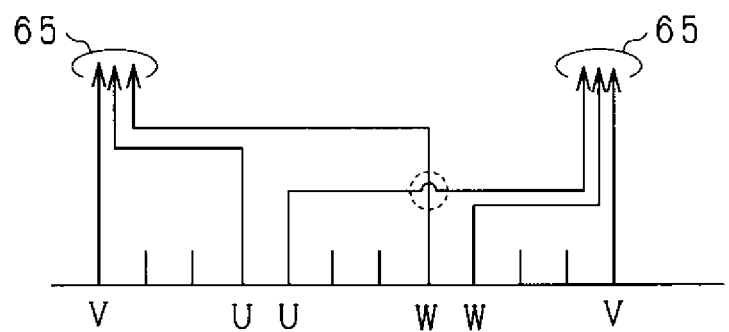
FIGS. 14(a) and 14(b) are diagrams illustrating routing of the neutral-line partial windings for each phase.
Figure 14B:
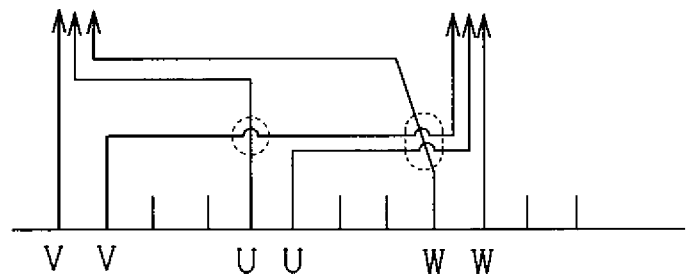

In this case, as illustrated in FIG. 14(a), the adjacent neutral-wire partial windings for the identical phase may be distributed in the circumferential direction and the tips of the neutral-wire partial windings may be connected together at a corresponding one of the neutral-wire connection points 65. This enables a further reduction in the number of crossings between the neutral wires at the coil end portion.

Second Embodiment

Now, a second embodiment will be described with the focus placed on differences from the first embodiment. In the stator core 20 in the second embodiment, the jumper wire structure for each phase in the slot outermost layer remains unchanged, but the connection structure for the neutral wires in the slot innermost layer differs from the corresponding structure in the first embodiment.

Figure 15:
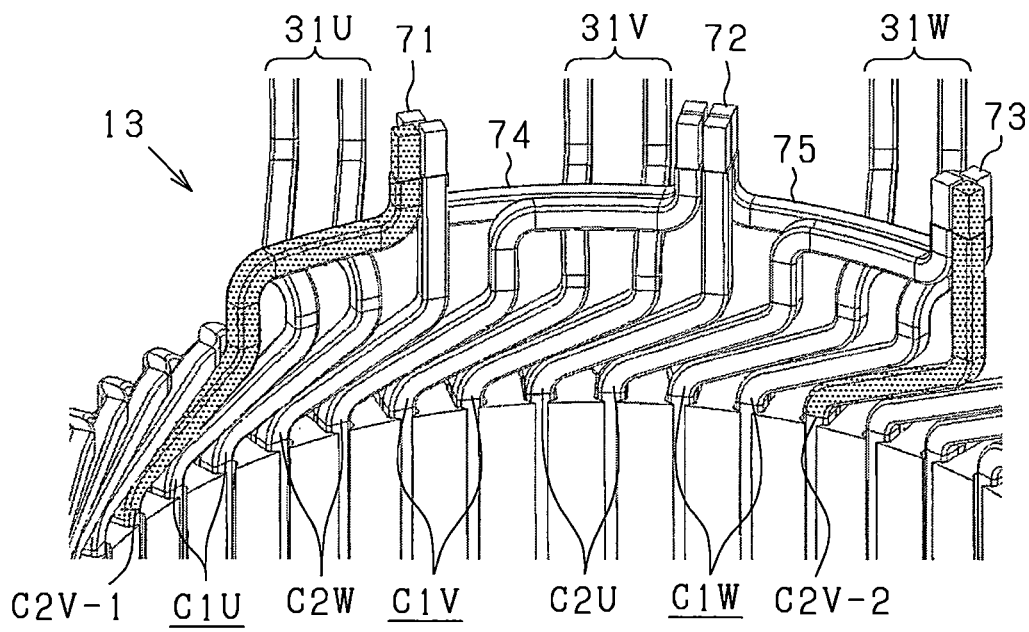
FIG. 15 is a partial perspective view of a stator according to a second embodiment.
Figure 16:
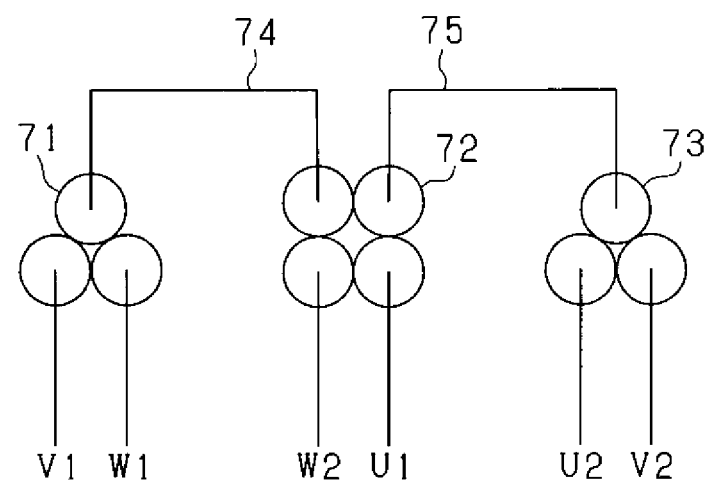
FIG. 16 is an actual wiring diagram of the neutral-line partial windings.

FIG. 15 is a perspective view of the stator 13 as viewed from the inner peripheral side. FIG. 16 is an actual wiring diagram of the neutral-wire partial windings. In FIG. 15 and FIG. 16, three sets of winding ends 71, 72, and 73 are provided, each set including a combination of neutral-wire partial windings for two different phases, the three sets of winding ends 71 to 73 being electrically connected together by two neutral-wire bus bars 74 and 75. Specifically, combinations (V1-W1), (W2-U1), and (U2-V2) are provided as combinations each including two partial windings for different phases. In this case, the phases in each combination are different from the phases in another. The combination (V1-W1) and the combination (W2-U1) are connected together by the neutral-wire bus bar 74. The combination (W2-U1) and the combination (U2-V2) are connected together by the neutral-wire bus bar 75.

The neutral-wire bus bars 74 and 75 are thus connected to the winding ends 71 to 73 such that different combinations of the neutral-wire partial windings are connected to the respective neutral-wire bus bars 74 and 75 and that the neutral-wire partial windings for all the phases are included at opposite ends of each of the bus bars 74 and 75. In other words, the partial windings connected to the opposite ends of each of the neutral-wire bus bars 74 and 75 include all the phases. In this case, the partial windings connected to the opposite ends of the neutral-wire bus bar 74 are V1 and W1 and W2 and U1 and thus include all of the U phase, the V phase, and the W phase. Furthermore, the partial windings connected to the opposite ends of the neutral-wire bus bar 75 are W2 and U1 and U2 and V2 and thus include all of the U phase, the V phase, and the W phase.

The neutral-wire partial windings for each phase are connected as described above. Thus, in a case where a current flows from one phase to another phase, the above-described connection suppresses a possible flow of an excess current through each of the neutral-line bus bars 74 and 75. Specifically, in a case where a current flows from the V phase winding to the W phase winding, the current flows directly from V1 on one side to W1 without passing through the neutral-wire bus bar 74 and flows from V2 on the other side to W2 via the neutral-wire bus bar 75. In other words, the current flowing from the V phase winding to the W phase winding directly flows through the winding end 71 and also flows via the neutral-wire bus bar 75. This prevents the flow, through each of the neutral-wire bus bars 74 and 75, of an excess current significantly exceeding a value of a current flowing through one partial winding. This also applies to the reverse flow from the W phase winding to the V phase winding.

Besides, a current flowing between the W phase winding and the U phase winding directly flows through the winding end 72 and also flows via the neutral-wire bus bar 74 or 75. Additionally, a current flowing between the U phase winding and the V phase winding directly flows through the winding end 73 and also flows via the neutral-wire bus bar 74. Thus, in a case where the current flows between the W phase winding and the U phase winding or between the U phase winding and the V phase winding, a possible flow of an excess current through each of the neutral-wire bus bars 74 and 75 is restrained.

Figure 17A:
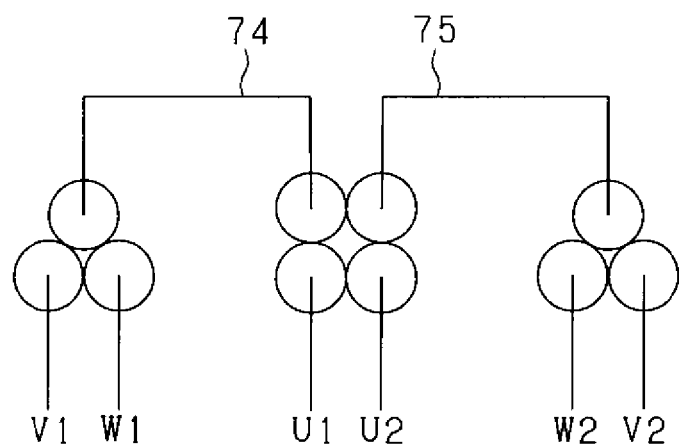
FIGS. 17(a) and 17(b) are actual wiring diagrams of the neutral-line partial windings.
Figure 17B:
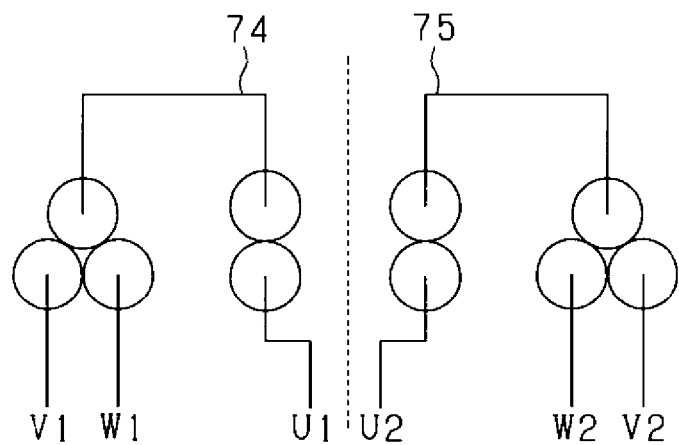

In FIG. 15 and FIG. 16, each of the plurality of winding ends 71 to 73 is configured by combining the neutral-wire partial windings for two different phases. However, this may be modified. For example, in FIG. 17(a), two of the three winding ends are each a combination of the neutral-wire partial windings for two phases, and the remaining one winding end is a combination of the neutral-wire partial windings for the identical phase. The winding ends are connected together by the neutral-wire bus bars 74 and 75. In FIG. 17(b), two neutral points are formed for each of the neutral-wire bus bars 74 and 75.

The neutral-wire bus bars 74 and 75 are connected to the neutral-wire partial windings (winding ends 71 to 73) such that different combinations of the neutral-wire partial windings are connected to the respective neutral-wire bus bars 74 and 75 and that the neutral-wire partial windings for all the phases are included at the opposite ends of each of the neutral-wire bus bars 74 and 75. A current flowing from one phase to another phase is thus distributed, allowing suppression of an increase in current density. This restrains a possible flow of an excess current through each of the neutral-line bus bars 74 and 75. Possible inappropriate insulation resulting from overcurrent can consequently be inhibited.

Furthermore, the plurality of winding ends 71 to 73 are each a combination of the neutral-wire partial windings for two phases (see FIG. 16). Thus, in a case where a current flows between different phases, current-carrying paths are formed through which the current flows via one of the neutral-line bus bars, the other neutral-line bus bar, and neither of the neutral-line bus bars. This enables a further reduction in the current flowing through the neutral-wire bus bars 74 and 75.

Other Embodiments

The above-described embodiments may be modified, for example, as described below.

In the above-described embodiments, in the configuration in which each of the parallel windings U1, U2, V1, V2, W1, and W2 circuits the stator core 20 twice, the jumper wires for each phase are provided at one point corresponding to the central position between the start point and the end point, that is, at the position located one circuit from the start point. However, this configuration may be modified. For example, the jumper wires for each phase are provided at two points corresponding to an intermediate position between the start point and the end point of each of the parallel windings U1, U2, V1, V2, W1, and W2. However, the parallel windings for each phase are also evenly arranged in the slots A and B in the stator core 20 all over the length of section of the parallel windings.

Figure 18A:
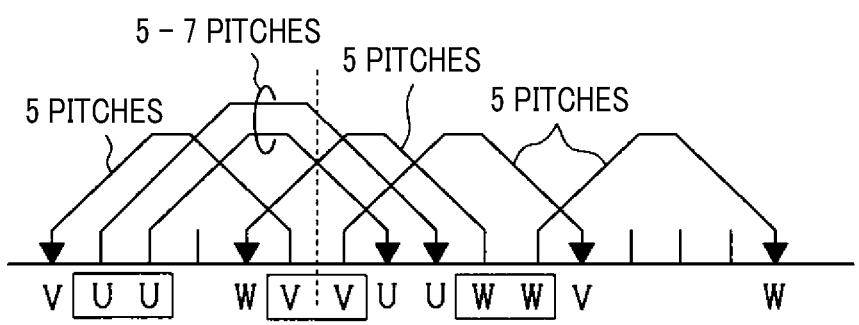
FIGS. 18(a) and 18(b) illustrate another form of the stator.
Figure 18B:
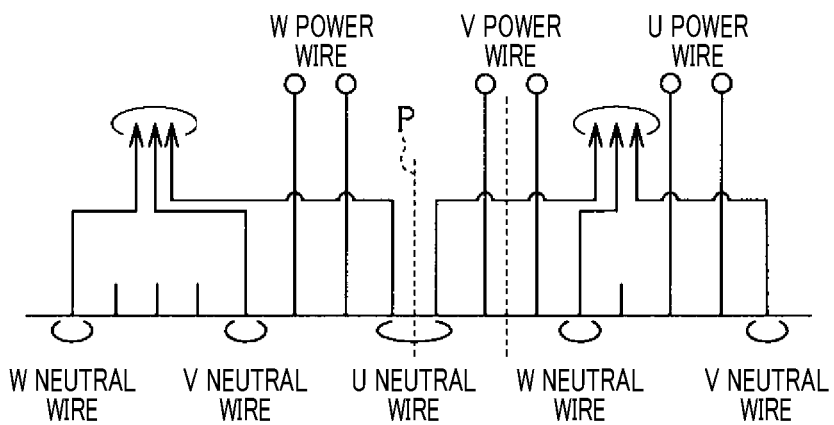

The phase windings may be configured as illustrated in FIGS. 18(*a*) and 18(*b*). In FIGS. 18(*a*) and 18(*b*), for the phase windings for one phase (U phase), included in the phase windings for the three phases 31U, 31V, and 31W, each 5-pitch jumper wire 61 and the corresponding 7-pitch jumper wire 62 are arranged to overlap each other in the axial direction, and for the phase windings for the remaining two phases (V phase and W phase), the two 5-pitch jumper wires 63 are spaced from each other in the circumferential direction.

In this case, the two parallel windings in each phase winding are respectively arranged on the right and the left of a predetermined position P in the core circumferential direction. Each of the winding ends of the neutral-wire partial windings may thus be easily formed using a combination of one neutral-wire partial winding for the U phase, one neutral-wire partial winding for the V phase, and one neutral-wire partial winding for the W phase.

The rotating electric machine may be put to practical use as a generator or an electric motor mounted in a vehicle or a machine mounted in a vehicle and that is capable of providing functions of both a generator and an electric motor. The rotating electric machine configured as described above may be used for applications other than the in-vehicle applications.

The present disclosure has been described in compliance with the examples. However, it is comprehended that the present disclosure is not limited to the examples or structures. The present disclosure includes various modifications and variations within the range of equivalency. In addition, the scope of the present disclosure and the spectrum of concepts include various combinations and forms and other combinations and forms each including only one additional element, more additional elements, or a part of the additional element.

What is claimed is:

1. A stator of a rotating electric machine comprising:
    an annular stator core including a plurality of slots arranged in a circumferential direction at a rate of two slots per phase and per pole; and
    stator lead wires including phase windings for three phases wound through the slots, wherein
    each of the phase windings is formed by parallel windings for each phase being connected together in parallel,
    the parallel windings for each phase include:
    power-wire partial windings connected to a power supply side,
    neutral-line partial windings connected to a neutral point,
    at least one of a set of 5-pitch jumper wires bridged at 5 slot pitches in the circumferential direction and each positioned between a corresponding power-wire partial winding and the corresponding neutral-line partial winding and a set of 7-pitch jumper wires bridged at 7 slot pitches in the circumferential direction and each positioned between the corresponding power-wire partial winding and the corresponding neutral-line partial winding; the power-wire partial windings, the neutral-wire partial windings, and the jumper wires being included in the plurality of partial windings forming the parallel windings, and
    for two of the three phases, each of the 5-pitch jumper wires and a corresponding one of the 7-pitch jumper wires overlap each other, and for a remaining single phase of the three phases, two of the 5-pitch jumper wires are spaced from each other in the circumferential direction, and each of the power-wire partial windings is adjacent to another power-wire partial winding for an identical phase or to a corresponding one of the neutral-line partial windings for a different phase.

2. The stator of the rotating electric machine according to claim 1, wherein
    for two of the three phases, each of the 5-pitch jumper wires and a corresponding one of the 7-pitch jumper wires overlap each other in an axial direction, and for the remaining single phase, two of the 5-pitch jumper wires are spaced from each other in the circumferential direction.

3. The stator of the rotating electric machine according to claim 1, wherein
    a coil end portion on an end surface side of the stator core is provided with two neutral-line connection portions to which three of the neutral-line partial windings for different phases are connected.

4. The stator of the rotating electric machine according to claim 3, wherein at the coil end portion on the end surface side of the stator core, adjacent neutral-line partial windings for identical phase distributively extend in the circumferential direction, and tips of the neutral-line partial windings are connected together at a corresponding one of the neutral-line connection portions.

5. The stator of the rotating electric machine according to claim 1, wherein
    the stator includes two neutral-wire bus bars connecting the neutral-line partial windings for at least two different phases included in the neutral-line partial windings of the parallel windings for each phase, and
    the neutral-line bus bars are connected to the neutral-wire partial windings such that different combinations of the neutral-wire partial windings are connected to the respective neutral-wire bus bars and that the neutral-line partial windings for all the phases are included at opposite ends of each of the neutral-line bus bars.

6. The stator of the rotating electric machine according to claim 5, wherein
    the neutral-line partial windings of the parallel windings for each phase include a plurality of winding ends each of which is a combination of the neutral-line partial windings for two different phases, and each of the neutral-line bus bars connects the winding ends together and is connected to the winding ends such that different combinations of the neutral-line partial windings are connected to the respective neutral-wire bus bars and that the neutral-line partial windings for all the phases are included at the opposite ends of each of the neutral-wire bus bars.

\* \* \* \* \*